United States Patent
Björnemo et al.

(10) Patent No.: US 10,520,643 B2
(45) Date of Patent: Dec. 31, 2019

(54) GEOPHYSICAL INVERSION USING SPARSE MODELING

(71) Applicant: PGS Geophysical AS, Oslo (NO)

(72) Inventors: Lars Erik Magnus Björnemo, Kista (SE); Carl Joel Gustav Skogman, Kista (SE)

(73) Assignee: PGS GEOPHYSICAL AS, Olso (NO)

( * ) Notice: Subject to any disclaimer, the term of this patent is extended or adjusted under 35 U.S.C. 154(b) by 301 days.

(21) Appl. No.: 15/272,578

(22) Filed: Sep. 22, 2016

(65) Prior Publication Data

US 2017/0108619 A1    Apr. 20, 2017

Related U.S. Application Data

(60) Provisional application No. 62/243,839, filed on Oct. 20, 2015.

(51) Int. Cl.
*G01V 1/37* (2006.01)
*G01V 99/00* (2009.01)
*G01V 3/38* (2006.01)

(52) U.S. Cl.
CPC ............. *G01V 99/005* (2013.01); *G01V 3/38* (2013.01); *G01V 1/375* (2013.01)

(58) Field of Classification Search
CPC ......... G01V 99/005; G01V 3/38; G01V 1/375
USPC ....................................................... 703/10, 2
See application file for complete search history.

(56) References Cited

U.S. PATENT DOCUMENTS

| | | | | |
|---|---|---|---|---|
| 6,246,963 | B1* | 6/2001 | Cross | G01V 11/00 702/14 |
| 8,923,094 | B2* | 12/2014 | Jing | G01V 1/28 367/73 |
| 9,348,059 | B2* | 5/2016 | Enstedt | G01V 99/005 |
| 9,910,189 | B2* | 3/2018 | Dickens | G06F 17/12 |
| 10,197,704 | B2* | 2/2019 | Holland | E21B 43/26 |
| 2002/0053430 | A1 | 5/2002 | Curtis et al. | |
| 2002/0099504 | A1* | 7/2002 | Cross | G01V 11/00 702/2 |

(Continued)

FOREIGN PATENT DOCUMENTS

| WO | 2012122503 A2 | 9/2012 |
|---|---|---|
| WO | 2013119906 A1 | 8/2013 |

OTHER PUBLICATIONS

Schamper et al., Theoretical analysis of long offset time-lapse frequency domain controlled source electromagnetic signals using the method of moments: Application to the monitoring of a land oil reservoir, 2011, J. Geophys. Res., 116, B03101, doi:10.1029/2009JB007114, pp. 1-23.*

(Continued)

*Primary Examiner* — Juan C Ochoa
(74) *Attorney, Agent, or Firm* — Patterson & Sheridan, LLP

(57) ABSTRACT

Methods of geophysical modeling and inversion are disclosed. A sparse domain is defined for a geophysical model, over which a sparse model result is computed. A full model result is then resolved by interpolation over the sparse domain. The full model result may be used as the forward modeling result in a geophysical inversion process. Reconstruction error, or model error, or both may be used to adjust the sparse domain, the model, or the geophysical basis of the model.

18 Claims, 4 Drawing Sheets

(56) References Cited

U.S. PATENT DOCUMENTS

| | | | |
|---|---|---|---|
| 2003/0216897 A1* | 11/2003 | Endres | G01V 11/00 703/10 |
| 2007/0010979 A1 | 1/2007 | Wallis et al. | |
| 2011/0108283 A1* | 5/2011 | Srnka | G01V 11/00 166/369 |
| 2012/0080197 A1 | 4/2012 | Dickens et al. | |
| 2012/0158389 A1 | 6/2012 | Wu et al. | |
| 2012/0232871 A1* | 9/2012 | Priezzhev | G01V 7/00 703/10 |
| 2013/0144529 A1* | 6/2013 | Seydoux | G01V 3/18 702/7 |
| 2013/0185033 A1 | 7/2013 | Tompkins et al. | |
| 2013/0265849 A1* | 10/2013 | Bunting | G01V 1/3826 367/16 |
| 2014/0129145 A1 | 5/2014 | Bjornemo et al. | |
| 2014/0359265 A1 | 12/2014 | Enstedt et al. | |
| 2015/0301222 A1* | 10/2015 | Davydychev | G01V 3/28 324/338 |
| 2016/0054466 A1* | 2/2016 | Cambois | G01V 1/3835 367/16 |
| 2016/0116638 A1* | 4/2016 | Kuchuk | G01V 99/005 703/2 |
| 2016/0178798 A1* | 6/2016 | Holland | E21B 43/26 703/2 |
| 2017/0146675 A1* | 5/2017 | De Cacqueray | G01V 1/005 |

OTHER PUBLICATIONS

Enstedt et al., "Propagation of uncertainty associated with towed streamer EM system data acquired 2012 into a 3D-inversion model", 2013, SEG Technical Program, Society of Exploration Geophysicists, pp. 795-799.*

Mattsson et al., Noise reduction and error analysis fora towed EM system, 2012, 82nd Annual International Meeting, SEG, pp. 1-5.*

Enstedt et al., Three-dimensional inversion of Troll West Oil Province EM data acquired by a towed streamer EM system, 2013, 75th Conference & Exhibition, EAGE, pp. 1-5.* inversion—Schlumberger Oilfield Glossary, available online at https://www.glossary.oilfield.slb.com/en/Terms/i/inversion.aspx, 1 page.*

Fernandez-Martinez et al., "Geometric Sampling: An Approach to Uncertainty in High Dimensional Spaces," C. Borgett et al. (Eds.): Combining Soft Computing & Stats. Methods, AISC 77, 2010, pp. 247-254, 11 total pages.

Extended European Search Report for Application No. 16194790.8-1559 dated Mar. 21, 2017, 14 total pages.

Egyptian Search Report issued to Application No. 1694/2016 dated Apr. 3, 2019.

Christian G. Nittinger et al., "Inversion of Magnetotelluric Data in a Sparse Model Domain", Geophys. J. Int. Jun. 9, 2016, 206, 1398-1409.

Mexico Office Action issued to MX/a/2016/013748 dated Jun. 5, 2019.

* cited by examiner

GEOPHYSICAL INVERSION USING SPARSE MODELING

CROSS-REFERENCE TO RELATED APPLICATIONS

This application claims benefit of U.S. Provisional Patent Application Ser. No. 62/243,839, filed Oct. 20, 2015, entitled "Modeling and Inversion Using Optimized Sparse Points in Frequency, Offset, and Position", which is incorporated herein by reference.

BACKGROUND

Certain aspects of the present disclosure generally relate to the field of geophysical surveying and may have particular applicability to components used in marine settings.

Inversion is a widely used process for reconstructing geological properties of a subsurface structure from recorded energy emanations and reflections of the structure. The structure is modeled based on estimated geophysical properties, and the energy return is predicted and compared with real survey data to determine the accuracy of the estimated properties.

In order to understand properties of the materials and structures in the earth, a model is typically used to derive the properties from the recorded data. In the case of electromagnetic surveying, the recorded data are typically voltages, and these voltages, related to characteristics of the source radiation and the geometry of the source and receiver arrangement, indicate the transformation of the radiation by the structures and materials in the earth. The transformation, in turn, indicates physical properties of the materials such as resistivity, magnetic permeability, density, and other physical properties. Using a physical model that relates such physical properties to transformations in electromagnetic radiation, the physical parameters can be iteratively determined by computing results from the model based on a representation of the known source radiation, the geometry of the survey, and estimates of the physical properties. Agreement of the model results with the detected radiation indicates the accuracy of the estimate, and if such accuracy is inadequate, the estimate is refined until a desired accuracy is reached. This process is typically called inversion. The sub-process of calculating model results, as part of the inversion process, is typically referred to as "forward modeling".

In a typical geophysical surveying process employing inversion, a large amount of data is collected over a wide geographical area. For purposes of inverting the data, the volume under the surveyed geographical area is represented as a "grid" or matrix of "cells", each representing a small volume of the surveyed area. Each cell may be modeled as having uniform physical properties, so that one value of a physical property applies to the entire cell. The physical property is estimated, and the forward model is computed to give an estimate of the recorded data. The estimate is compared to the recorded data, and the quality of the fit is judged and compared to one or more criteria. If the quality of the fit is insufficient, the estimate of the physical property of each cell is adjusted, and the forward model recomputed. This iterative process continues until the fit criteria are met, at which point the inversion is said to have "converged".

Computing the forward model of resistivity and computing an adjustment to the estimate are the two resource intensive parts of the inversion process. Techniques for reducing computational time and resource requirements of these two parts are needed.

BRIEF DESCRIPTION OF THE DRAWINGS

So that the manner in which the features of the present disclosure can be understood in detail, a description of the disclosure may be had by reference to aspects, some of which are illustrated in the appended drawings. It is to be noted, however, that the appended drawings illustrate only typical aspects of this disclosure and are therefore not to be considered limiting of its scope, for the disclosure may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

It is to be understood the present disclosure is not limited to particular devices or methods, which may, of course, vary. It is also to be understood that the terminology used herein is for the purpose of describing particular aspects only, and is not intended to be limiting. As used herein, the singular forms "a", "an", and "the" include singular and plural referents unless the context clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." Terms such as "coupled", "coupling", and "couplable" refer to being directly or indirectly connected.

This disclosure may have applications in marine surveying, in which one or more energy sources are used to generate wavefields, and sensors—either towed or ocean bottom—receive energy generated by the sources and affected by the interaction with the subsurface formation. Likewise, this disclosure may have applications in marine electromagnetic (EM) surveying, in which one or more EM field sources are used to generate EM fields, and EM sensors—either towed or ocean bottom—receive EM energy generated by the EM sources and affected by the interaction with the subsurface formations.

Figure 1:
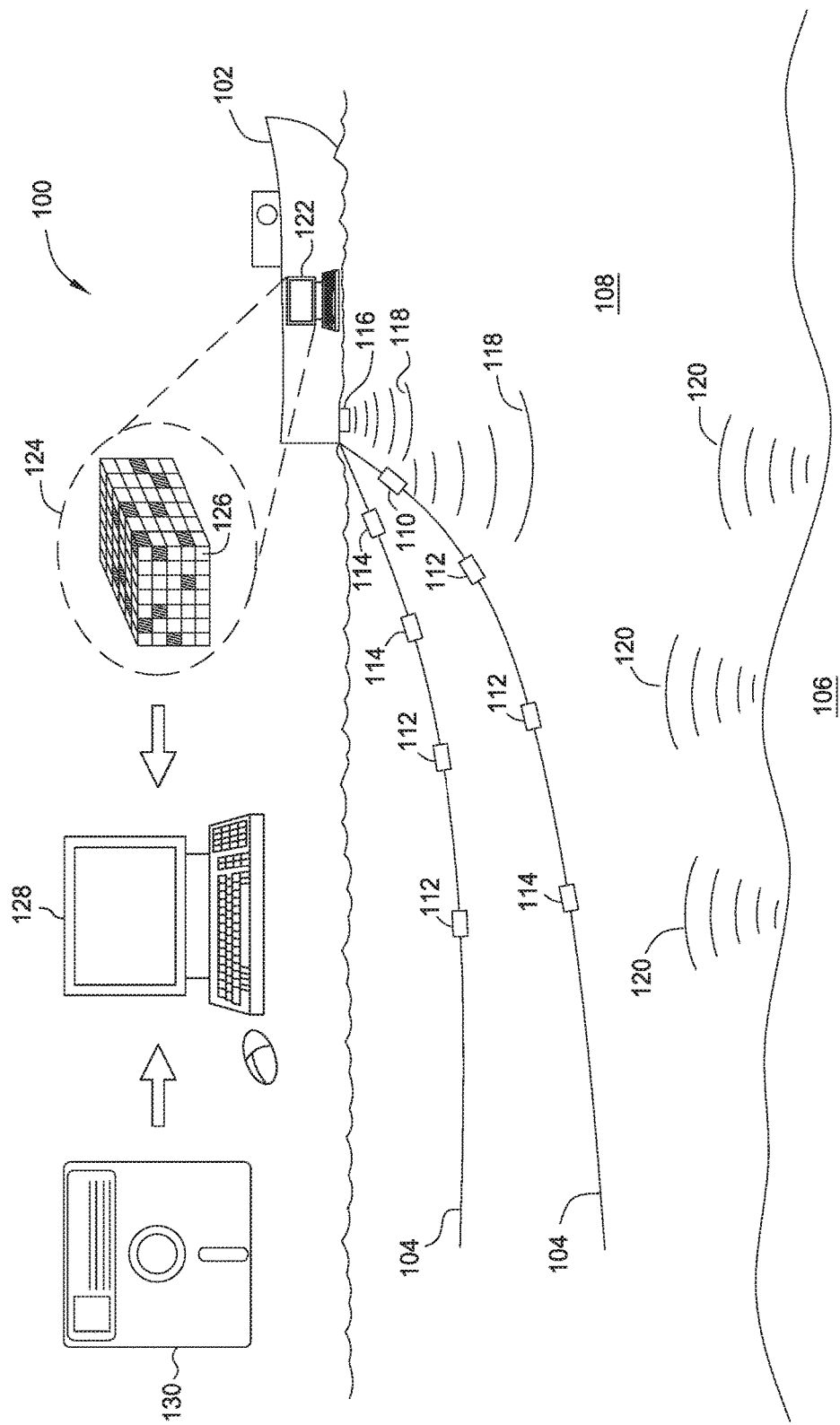
FIG. 1 is an example activity diagram showing a data acquisition scheme in a marine context.

FIG. 1 is an example activity diagram showing a data acquisition scheme 100 in a marine context. A vessel 102 typically tows one or more device assemblies 104 that are used to survey an area of the earth 106 beneath a body of water 108. A device assembly 104 may have a plurality of diverse devices for accomplishing the survey. One or more electromagnetic field sources 110, electromagnetic receivers 112, and acoustic receivers 114 may be included. As shown in FIG. 1, one device assembly 104 may include all three types of devices. A device assembly 104 may also include positioning devices such as location monitoring devices and steering devices, power, data, thermal, and buoyancy management devices, and the like. One or more acoustic energy sources 116, such as air guns or marine vibrators, may be attached to the vessel or included in a device assembly towed from the vessel.

The sources 110 and 116, electromagnetic and acoustic respectively, emit probe energy 118 into the environment that travels into the area 106 being surveyed. The earth emits response energy 120, which may be electromagnetic or acoustic. The response energy 120 is recorded by the receivers 112, 114. The response energy is represented as data, such as pressure and voltage data, collected from the environment immediately surrounding the various receivers. The data is transmitted to a data storage device 122, which may be physically located on the vessel 102 as shown in FIG. 1, or may be remote if the data is transmitted wirelessly. The data storage device 122 may be a data server including a computer and electronic storage medium configured to manage storage of the data, or the data storage device 122 may be a data processor, including a computer with data processing software for transforming the data in any convenient manner.

The objective of the survey is to use the data collected by the receivers to predict physical properties of the area 106, which in turn can be used to predict the location of resource deposits in the area 106. The area 106 is represented by a cellular domain 124 comprising a series of cells 126 having homogeneous properties. Each cell represents a certain location and neighborhood of the area 106, and is modelled as a point in a mathematical domain. A computer processing system 128 is used to determine the physical properties of the cells 126 that best match the collected data. The resulting physical properties may be stored on a non-transitory computer-readable medium 130 for use at any convenient location. The medium 130 may also include instructions for producing the physical properties from the data, instructions or codes for rendering the physical properties to a rendering device, such as a display or printer, and the like.

Figure 2:
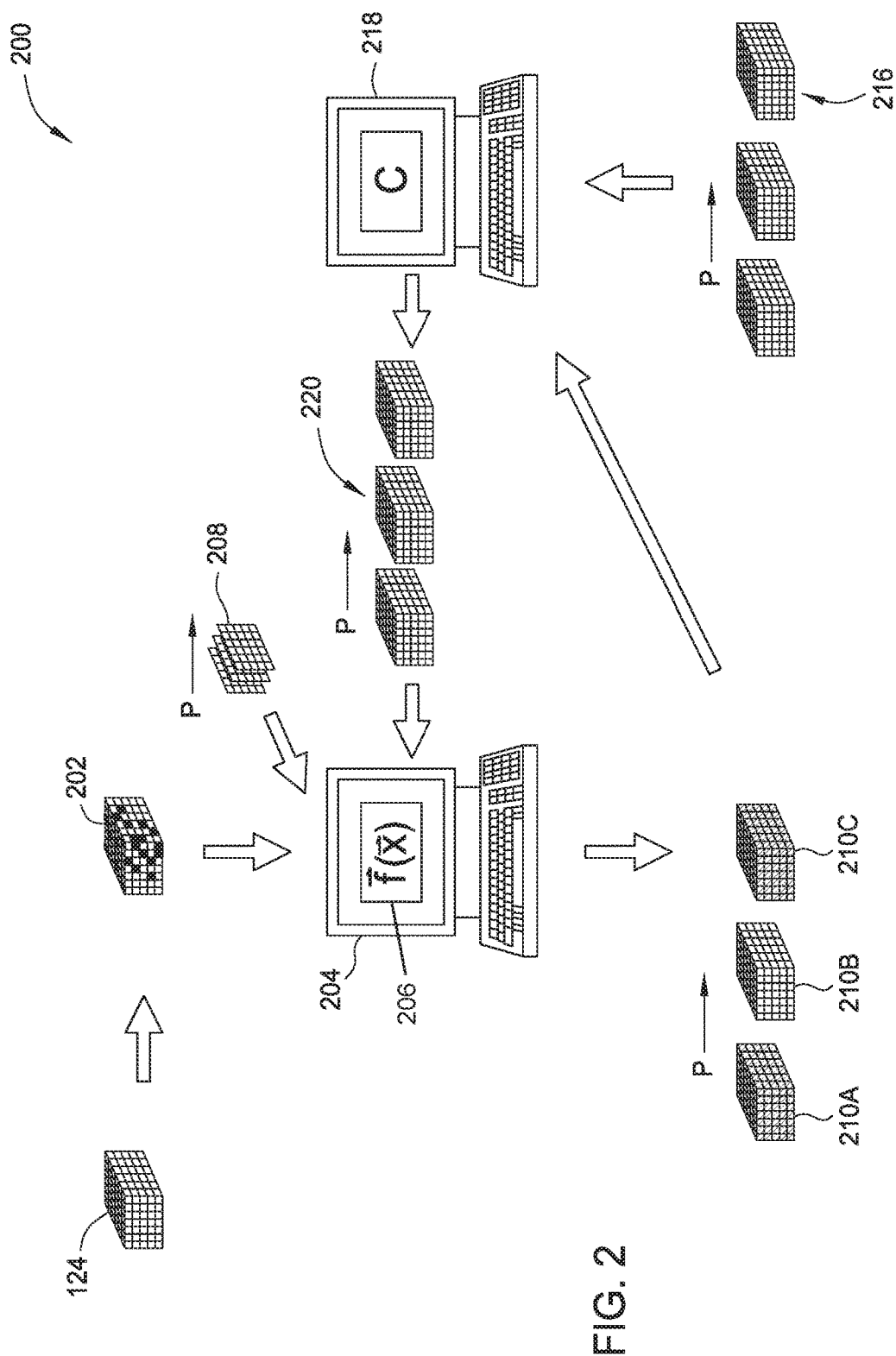
FIG. 2 is a process diagram illustrating a process according to one embodiment.

One widely used technique for predicting physical properties from the collected data is inversion. FIG. 2 is a process diagram of a process 200 for modeling a geophysical system using inversion. The cellular domain 124 is used to form a data set 202 representing the physical properties of the cells 126, and thus the surveyed area 106. The data set 202 is provided to a computer system 204 that contains an implementation of a model 206 of a geophysical system representing the survey area 106. The data set 202 furnishes the geophysical basis for the geophysical model 206, and the cellular domain 124 serves as part of the domain of the mathematical model underlying the geophysical model 206. The model 206 is initialized with an input 208, which represents a probe energy delivered to the surveyed area 106. The probe energy may be parameterized by one or more parameters P, which may be discrete or continuous, and may include, for example, frequency, offset, and source/receiver position. The computer system 204, and the model 206, are used to compute a model result 210, where every cell relates to a predicted reading of a sensor in the survey. The model result 210 generally has the same domain as the model 206, and represents a predicted response energy from the surveyed area 106. The model 206 predicts the response energy that would be received from the surveyed area 106 based on the probe energy 118. The model result 210 may also be parameterized by the parameter(s) P, as shown by illustrating model results 210A, B, and C at three different values of the parameter(s) P.

Computing this "forward model", as the model is generally known, is often very resource intensive, sometimes requiring very large computers and a great deal of computing time to complete. The resource and time requirement for computing the forward model may be reduced by computing the forward model only for a subset of the entire domain and interpolating the cells between the computed cells. In FIG. 2, the model result 210 contains parts 210A and 210C that have been computed using the model 206, and at least one part 210B that has been interpolated from the parts 210A and 210C. The parts 210A and 210C that have been computed using the model 206 are based on a sparse domain, and the results for those cells are a sparse model result. The model result 210, including the computed cells 210A and 210C as the sparse model result and the interpolated cells 210B, represents a predicted response from the area 106 to the probe energy 118. Although, for illustration purposes, only two computed parts and one interpolated part are shown in FIG. 2, many more computed and interpolated parts are typically used.

The recorded data 216, which is actual data from the sensors representing energy actually emitted by the survey area 106, including response energy emitted in response to probe energy delivered to the surveyed area at different values of the parameter(s) P, is compared to the model result 210. A computer system 218 is typically used for the comparison, which yields an error 220. The error 220 is then used to refine the data set 202 as an improved geophysical basis for the model 206, and the cycle is repeated until the error 220 is sufficiently small to indicate convergence.

The process of FIG. 2 yields a final version of the data set 202 that can be used to predict not only physical properties of the area 106, but also presence of resources that might be of interest for recovery from the earth.

Figure 3:
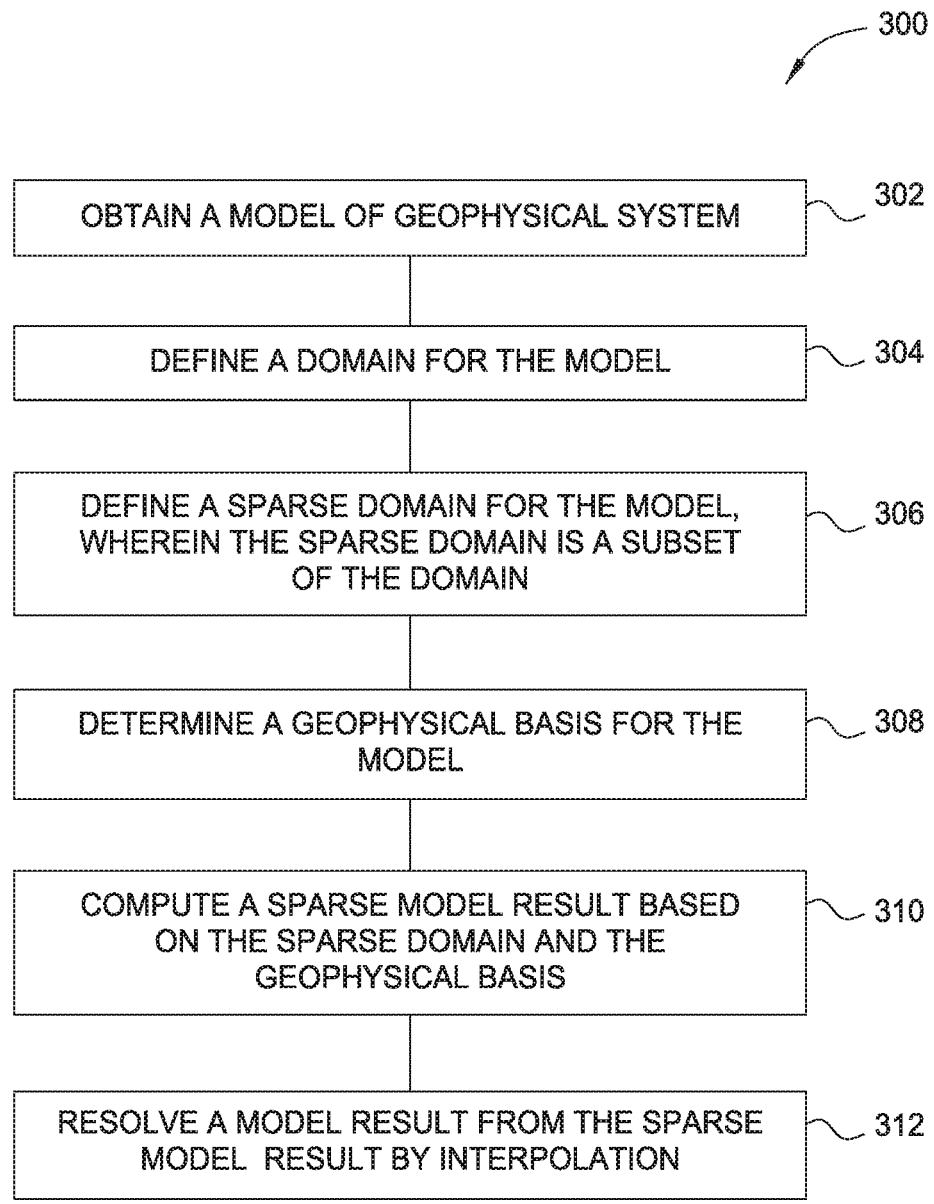
FIG. 3 is a flow diagram of a modeling process according to another embodiment.

FIG. 3 is a flow diagram of a modeling method 300. The modeling method 300 may be used as a method of modeling a geophysical system, and may be included in a geophysical inversion process. At 302, a model $M(b(x), \mu(z))$ of a geophysical system is obtained. The model is typically a mathematical function that resolves a modeled response based on some geophysical condition. For example, the model may be an equation or system of equations, or implementation thereof in a computer system, that maps a mathematical representation of probe energy $\mu(z)=\mu(x, a)$ such as incident electromagnetic energy, based on a geophysical basis $b(x)$ including, for example, electrical resistivity and/or density, to a modeled response energy such as output electromagnetic radiation. The model may be linear, non-linear, or linearized. The model is generally obtained by a geophysicist applying geophysical principles to a particular area of interest and resolving equations or relations describing geophysical parameters of interest as a function of other parameters such as space, time, source and receiver location, frequency, and the like.

The model is typically applied to an area of the earth by expressing the probe energy, such as acoustic or electromagnetic energy, mathematically or numerically, defining the geophysical basis b of the area of the earth, and computing a predicted response of the area of the earth to obtain the model result. A domain z of the model is defined at 304 that may include a physical domain x and a parameter domain a. The physical domain $x=\{x_1 \ldots x_n\}$ of the model represents the area of the earth, where each $x_i$ is a set of points that defines the extent of the physical domain x in the ith dimension. The physical domain may have any desired dimensionality n, for example two, three, four, or more dimensions, which may represent any combination, basis, construction, or manifestation of space and time, including transform spaces such as frequency and wavenumber. In some cases the physical domain contains two spatial dimensions and one time dimension. In other cases, the physical domain contains three spatial dimensions and one time dimension. The physical domain x is typically divided into cells, one cell representing a location of the domain. The incident energy μ is also based on a parameter domain a that may include frequency, offset, and source and receiver position. The parameter domain may also have any desired dimensionality, including any number of geometric parameters, parameters of survey construction, energy parameters, and the like, which may be direct or derived. The parameter domain may also be divided into cells, each cell representing a "location," or particular value or neighborhood, of the parameter space. Together, the physical domain x and the parameter domain a define the domain z of the model M.

The inventors have discovered that use of computing resources to obtain the model result may be reduced by computing the model on only a subset of the parameter domain α. For models that can be furnished with parameter domains of sufficient resolution that granularity of the model is small, or if a model can predict the effect of a parameter over some suitable range, a reliable model result can be obtained by computing the model on only a subset of the parameter domain. Some model accuracy may be sacrificed in such a process, and the reduction in accuracy of the model is juxtaposed with the improvement in processing speed and resources required to achieve a particular result.

Thus, at 306, a sparse domain z* is defined that is a subset of the domain z and is sparse in the parameter domain α. The sparse domain z* is thus made up of the physical domain x and a sparse parameter domain α*, which is a subset of the parameter domain α. The sparse domain z* may have a regular sampling of the parameter domain α, or the sparse domain z* may have a non-uniform sampling of the parameter domain α.

The sparse domain z* includes a sparse parameter domain α*, which may have any desired density, uniformity, and periodicity, which may vary through the sparse parameter domain α*. For example a first region of the sparse parameter domain α* may have a first density, a second region of the sparse parameter domain α* may have a second density, and the first and second densities may be unequal so that the sparse parameter domain α* has non-uniform density. In this regard, density $\delta(\alpha^*, \in)$ of the sparse parameter domain α* is defined as the number of points of the sparse parameter domain α* divided by the number of points of the parameter domain a in a given interval $\in$. The density δ is a vector quantity, since the density may have different magnitude in different dimensions, and may have different magnitude depending on the interval $\in$. The location and density of points in the sparse parameter domain α* may be defined based on geophysical principles and/or properties, such as known a priori geophysical gradients, or values of the parameters themselves, such as source/receiver distance. For example, it is known that variation in electric field declines with distance from an electromagnetic field source. Thus, density of the sparse parameter domain α* may decline with source/receive distance with only minor increase in modeling error, also called reconstruction error. Accordingly, density of the sparse parameter domain α* may vary with water depth, as well. In another example, it is known that optimal frequency sampling is close to logarithmic, with denser sampling at lower frequencies. This type of frequency distribution is difficult to achieve in a real energy source, but may be implemented through a sparse domain sampling in a modeling process.

At 308, a geophysical basis b is defined for the model. As discussed above, the geophysical basis may be a physical property such as electrical resistivity or density estimated for each cell in the domain, and may include boundary conditions at edges or internal surfaces of the domain. The geophysical basis may also include conditions to be imposed on the physical properties, such as ranges and maximum or minimum gradients. The geophysical basis b is defined for the physical domain x and may include aspects that follow known a priori geophysical conditions.

At 310, a sparse model result m*(z*)=M(b,μ) is computed based on the sparse domain z* and the geophysical basis b. The sparse model result is a prediction of the response energy from the locations of earth corresponding to the sparse domain.

At 312, a model result m(z) is resolved from the sparse model result m*(z*) by interpolation. In one aspect, the interpolation may be a linear interpolation with forced adoption of the sparse model result.

$$m(z_j) \leftarrow m^*(z_i^*) \text{ if } z_j = z_i^*$$

$$m(z_j) \leftarrow \frac{z_j - z_i^*}{z_{i+1}^* - z_i^*} * (m_{i+1}^* - m_i^*) + m_i^* \text{ if } z_i^* < z_j < z_{i+1}^*$$

The interpolation above is represented as a scalar operation, but in most cases, the interpolation will be multi-dimensional. For a multi-dimensional linear interpolation to find a particular value of m at location $z_j$, an interpolant is defined for dimension p, of the domain z as follows:

$$I_p = \frac{z_{p,j} - z_{p,i}^*}{z_{p,i+1}^* - z_{p,i}^*} \text{ where } z_{p,i}^* < z_{p,j} < z_{p,i+1}^*$$

Here, we use the "star" notation to refer to the sparse domain, as defined above. Defining an interpolant vector, and transpose thereof, using the above interpolant, $$I_p = \begin{bmatrix} 1 - I_p \\ I_p \end{bmatrix}$$

$$I_p^T = (1 - I_p, I_p)$$

and, for an exemplary three-dimensional interpolation, defining intermediates $$m_{fgh} = m^*(z_{1,i+f}^*, z_{2,i+g}^*, z_{3,i+h}^*) \text{ where } f, g, h = 0 \text{ or } 1$$

$$M_h = \begin{bmatrix} m_{00h} & m_{10h} \\ m_{01h} & m_{11h} \end{bmatrix} \text{ where } h = 0 \text{ or } 1$$

$$c_h = I_2^T M_h I_1$$

$$c = (c_0, c_1)$$

then $$m(z) = m(z_1, z_2, z_3) = cI_3 \text{ for all } z_i \neq z_i^*$$

$$m(z) = m^*(z_1^*, z_2^*, z_3^*) \text{ for all } z_i = z_i^*.$$

Interpolation may be performed across all dimensions of the parameter domain, or only some dimensions. Thus, the domain has a first dimensionality, and the interpolation has a second dimensionality, where the first and second dimensionalities may be equal or unequal.

Low density of the sparse domain reduces computation time for the sparse model, but increases reconstruction error of the model. Reconstruction error is defined as the error in the model when fully reconstructed from the sparse model result. Thus, if a fully computed comparison model result $m^c(z)=M(b(x), \mu(z))$ is compared to the reconstructed model, the reconstruction error is $e_r=m^c-m$. In many cases, the magnitude of the data density vector $\|\delta\|$ is inversely related to the reconstruction error $e_r$. That is, higher data density in the sparse domain results in lower reconstruction error. Reconstruction error may be computed as part of the method 300. If the reconstruction error $e_r$ exceeds a threshold, any or all of the sparse domain, the geophysical basis, and the interpolation, or method of interpolation, may be repeated or adjusted, and a particular sparse domain that results in a particular reconstruction error and processing time may be selected. Changing the sparse domain may include changing any or all of the density, uniformity, and periodicity of the sparse domain.

The interpolation may be weighted or adjusted in any convenient way by applying a weighting factor to the interpolant, for example:

$$I_p = \sigma_p \frac{z_{p,j} - z^*_{p,i}}{z^*_{p,i+1} - z^*_{p,i}} \text{ where } z^*_{p,i} < z_{p,j} < z^*_{p,i+1}$$

where $\sigma_p$ is a weighting factor for the p dimension. The weighting factor may be based on any desired factor, such as a noise metric or smoothing function. Weighting the interpolant has the effect of displacing the interpolation from a linear relationship, for example in a sub-linear ($\sigma_p<1$) or super-linear ($\sigma_p>1$) fashion. The interpolation may also be stepped according to any desired increment. For example, an interpolant in direction p with step s may be defined as $$I_{p,s} = \frac{z_{p,j} - z^*_{p,i}}{z^*_{p,i+s} - z^*_{p,i}} \text{ where } z^*_{p,i} < z_{p,j} < z^*_{p,i+s}$$

and s is an integer that is 1 or more. The weighting factor $\sigma_p$ may also be included if desired. The corresponding intermediates (for three dimensions) are then defined as $$m_{fgh} = m^*(z^*_{1,i+f}, z^*_{2,i+g}, z^*_{3,i+h}) \text{ where } f, g, h = 0 \text{ or } s$$

$$M_h = \begin{bmatrix} m_{00h} & m_{s0h} \\ m_{0sh} & m_{ssh} \end{bmatrix} \text{ where } h = 0 \text{ or } s$$

$$c_h = I_2^T M_h I_1, \text{ and}$$

$$c = (c_0, c_s).$$

Using interpolants of step greater than 1 may be useful to reduce the effect of large gradients in the geophysical basis, for example. Interpolants of different steps may also be used in combination. Estimates may be computed based on interpolants of different steps and combined to yield the final model result. For example, a first sparse model result may be obtained using interpolation at a first step value, a second sparse model result may be obtained using interpolation at a second step value, and the results combined according to a linear combination, which may be weighted, to yield a model result.

Different interpolations may be used at different parts of the sparse domain. For example, a first interpolation may be performed at a first part of the sparse domain, and a second interpolation, different from the first interpolation, may be performed at a second part of the sparse domain. The interpolations may be different according to weighting factors, step values, combinations of step values, or combinations of weighting factors and step values. For example, in some cases larger step values may be used where density of the sparse domain is high, and smaller step values may be used where density of the sparse domain is low. Step values and weighting factors may also be adjusted based on reconstruction error of the model. For example, a first model result may be computed by interpolation, and a first reconstruction error determined. Then, any or all of weighting factors, step values, sparse domain density, and geophysical basis may be changed, and a second model result computed. A second reconstruction error can then be determined and compared with the first reconstruction error. Based on the comparison, the first model result or second model result may be selected, and the basis for the selected result may be employed to perform forward modeling, such as for a geophysical inversion process. The geophysical inversion process can be used to resolve a data set representing physical properties of the surveyed area of the earth, which in turn can be used to predict the location of resource deposits in the surveyed area.

Figure 4:
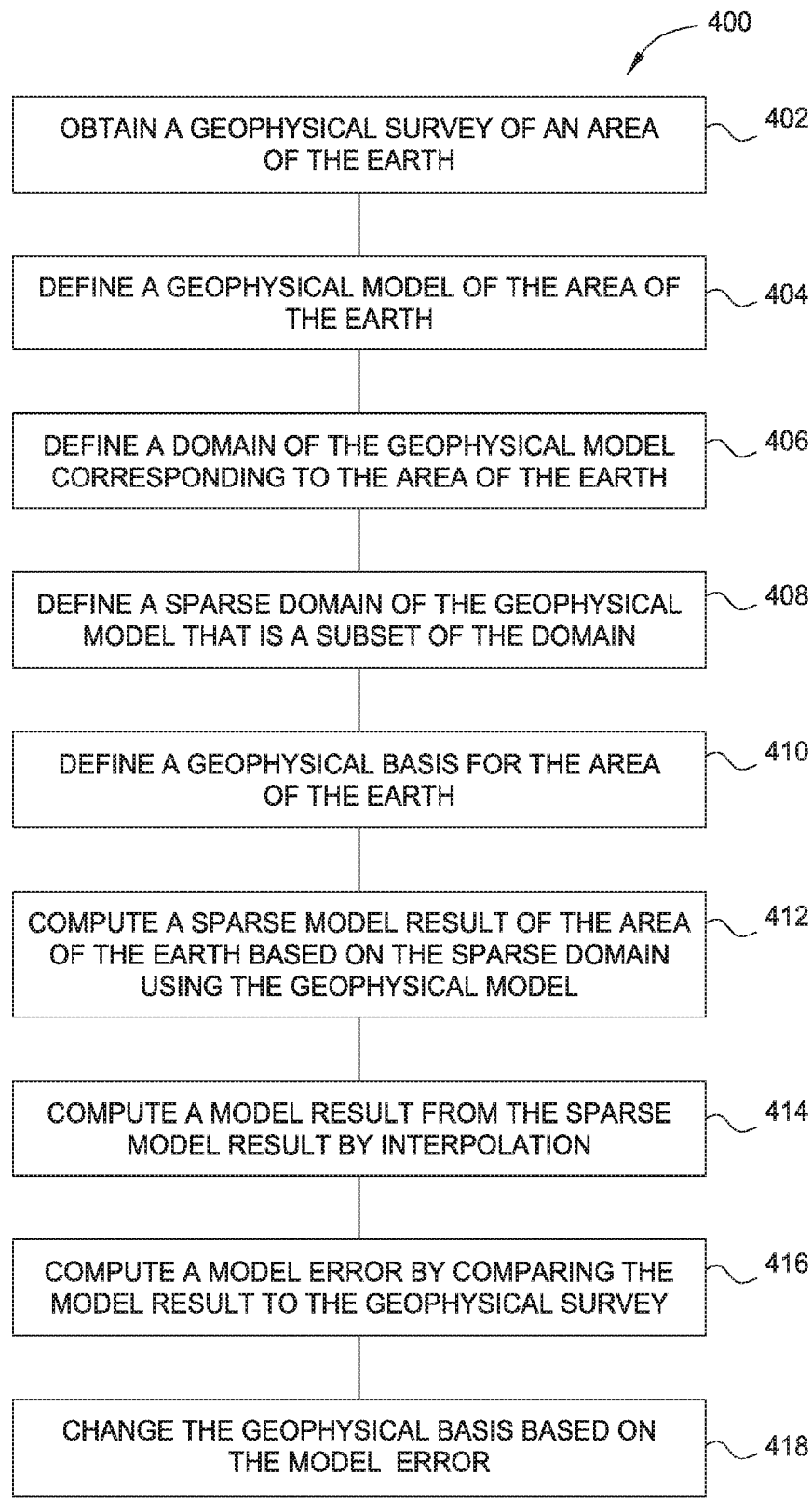
FIG. 4 is a flow diagram of a geophysical inversion process according to another embodiment.

FIG. 4 is a flow diagram summarizing a geophysical inversion process 400 according to another embodiment. The process 400 may be used along with the modeling method 300 to determine geophysical properties of an area of the earth. At 402, a geophysical survey of an area of the earth is obtained. A geophysical acquisition is performed, and the geophysical survey obtained containing data that represents an energy response of the area of the earth to probe energy used during the acquisition. The probe energy may generally be seismic/acoustic energy or electromagnetic energy, or both. The data of the geophysical survey is typically recorded in a non-transitory computer-readable medium, such as the computer-readable medium 130 of FIG. 1, which may be readily transported from one place to another.

At 404, a geophysical model $M(b(x), \mu(z))$ of the area of the earth is defined. The geophysical model is used to model the response of the area of the earth to probe energy $\mu(z)$ based on some geophysical basis $b(x)$. As noted above regarding operation 302, the model may be linear, non-linear, or linearized. Similar to operation 304 above, a domain z is defined for the geophysical model at 406, the domain including a physical domain x representing an area of the earth corresponding in some way to the area of the geophysical survey obtained at 402, and a parameter domain a that may include frequency, offset, and positions of sources and receivers. Thus, $z=x \cup \alpha$. The physical domain x may correspond exactly to the surveyed area, may include the surveyed area, or may be a subset of the surveyed area. Similar to operation 306, a sparse domain z* is defined at 408 that is a subset of the domain z and includes a sparse parameter domain $\alpha^*$. As noted above, the sparse domain may have a sampling of the parameter domain and may be defined according to geophysical principles or conditions.

The geophysical basis $b(x)$ is defined at 410. The geophysical basis $b(x)$ may include geophysical properties such as resistivity and/or density, is defined for each location of the physical domain x, and may be defined, in part, based on known a priori geophysical conditions. The geophysical basis defined at 410 may be an initial basis or a changed basis to be discussed further below. The geophysical basis yields a final result of the inversion process 400 when a convergence criterion is reached.

Similar to operation 310, at 412 a sparse model result $m^*(z^*)=M(b(x^*), \mu(z^*))$ is computed using the geophysical model and basis. At 414, a model result $m(z)$ is computed from the sparse model result by interpolation according to any of the embodiments described above in connection with operation 312. As defined above, a reconstruction error may also be computed to determine quality and/or usability of the model result. If the reconstruction error exceeds a threshold, the sparse domain may be redefined with a different data density, pattern, or distribution to improve the reconstruction error. As noted above, one measure of reconstruction error is the difference between the sparse model result and a fully computed model result over the entire domain z. A single scalar metric may be realized by a norm or quasi-norm of the array $e_r$ (quasi-norm referring to a norm of a regularized version of the array $e_r$ if the array is otherwise irregular or has no defined norms), or performing some other scalar operation on the array $e_r$, for example summing the elements of $e_r$.

In some cases, the sparse domain, interpolation method, and/or interpolation pattern, which may be referred to as the model basis, may be adjusted to reduce processing time at a given reconstruction error. In one example, a given model and geophysical basis may be used to find a model basis that results in minimized processing time with reconstruction error at or below a given limit. The model basis may be iteratively adjusted to increase reconstruction error and reduce processing time until the limiting value of reconstruction error is reached. Such methods may be used along with adjustments to the geophysical basis, including probe energy patterns (i.e. frequency and shotpoints) to find a combination of acquisition design and model basis that results in minimum processing time for a selected reconstruction error. The model basis may be adjusted in ways including adjusting the density, uniformity, and periodicity of the sparse domain based on the model error.

The geophysical system is perturbed to obtain geophysical survey data $d(z)$ representing a perturbation response of the system. At 416, the model result is compared to the perturbation response defined by the geophysical survey data $d(z)$ to define a model error $e_m$, for example $e_m=m-d$. At 418, the model error is used to refine the geophysical basis. Model reconstruction error may also be used to refine the geophysical basis. Model error may also be used to refine the model basis. For example, at locations where model error and reconstruction error are relatively large (i.e. larger than some representative metric of the overall model error or reconstruction error, such as an average, by some selected margin, such as a standard deviation or multiple thereof), model basis may be adjusted without adjusting geophysical basis. Likewise, where model error is relatively large and reconstruction error is relatively small, geophysical basis may be adjusted without adjusting model basis. Where model error is relatively small and reconstruction error is relatively large, data density, a component of the model basis, may be adjusted without adjusting the geophysical basis. In other embodiments, the adjustment made to the geophysical basis may be weighted using the reconstruction error, where large reconstruction error can be used to diminish the magnitude of the geophysical basis adjustment.

The method 400 may be performed iteratively, with the adjusted geophysical and model bases being used in the next iteration of the method, until a convergence criterion, which may be defined based on the model error, is reached. In such cases, the reconstruction error may be computed at each iteration of the method 400, or only at selected iterations or frequencies, for example every 5 or 10 iterations of the method. At any point where reconstruction error is computed, if the reconstruction error exceeds tolerance, the model basis may be adjusted and the model result recomputed. Alternately, the model basis may be adjusted without recomputing the model result, and the fully computed model $m_c$ may be used for the model result.

After convergence is reached, the geophysical basis contains information that may be used to predict the presence of resources, such as hydrocarbon deposits, in the surveyed area of the earth. The geophysical basis may be used as a geophysical data product representing electrical resistivity of the surveyed area.

While the foregoing is directed to aspects of the present disclosure, other and further aspects of the disclosure may be devised without departing from the basic scope thereof, and the scope thereof is determined by the claims that follow.

What is claimed is:

1. A method of modeling a geophysical system, comprising:
   defining a geophysical model of an area of the earth;
   defining a domain for the geophysical model including a physical domain and a parameter domain, wherein the parameter domain comprises frequency, offset, and source position and receiver position;
   defining a sparse domain for the geophysical model, wherein the sparse domain has a sparse parameter domain that is a subset of the parameter domain, wherein a density of points in the sparse parameter domain
      declines with a distance between the source position and the receiver position;
   determining a geophysical basis of the geophysical system;
   computing a sparse model result based on the sparse domain and the geophysical basis; and
   resolving a model result from the sparse model result by interpolation.

2. The method of claim 1, further comprising determining a reconstruction error of the model result by computing a comparison model result based on the domain, and comparing the model result to the comparison model result.

3. The method of claim 2, further comprising changing the sparse domain based on the reconstruction error.

4. The method of claim 3, wherein changing the sparse domain comprises changing one or more of a density, uniformity, and periodicity of the sparse domain.

5. The method of claim 1, further comprising obtaining a perturbation response of the geophysical system and defining a model error by comparing the model result to the perturbation response.

6. The method of claim 5, further comprising changing one or more of a density, uniformity, and periodicity of the sparse domain based on the model error.

7. The method of claim 6, wherein the geophysical basis includes electrical resistivity.

8. The method of claim 1, wherein the domain has a first dimensionality, the interpolation has a second dimensionality, and the first dimensionality is equal to the second dimensionality.

9. The method of claim 1, further comprising performing a geophysical inversion process using the model result to form a data set representing physical properties of the area of the earth; and using the data set to predict the location of resource deposits in the area of the earth.

10. A method of determining physical properties of an area of the earth, comprising:
- obtaining a geophysical survey of an area of the earth;
- defining a geophysical model of the area of the earth;
- defining a domain of the geophysical model including a physical domain and a parameter domain, wherein the parameter domain comprises frequency, offset, and source position and receiver position;
- defining a sparse domain including the physical domain and a sparse parameter domain that is a subset of the parameter domain, wherein a density of points in the sparse parameter domain
  - declines with a distance between the source position and the receiver position;
- defining a geophysical basis for the area of the earth;
- computing a sparse model result based on the sparse domain using the geophysical model;
- resolving a model result from the sparse model result by interpolation;
- defining a model error by comparing the model result to the geophysical survey; and
- changing the geophysical basis based on the model error.

11. The method of claim 10, further comprising:
- determining a reconstruction error of the geophysical model by resolving a comparison model result of the area of the earth based on the domain, and comparing the model result to the comparison model result; and
- changing the sparse domain based on the reconstruction error.

12. The method of claim 11, wherein changing the sparse domain comprises changing one of a density, a uniformity, and a periodicity of the sparse domain.

13. The method of claim 12, further comprising:
- defining a convergence criterion based on the model error; and
- repeating the computing the sparse model result, resolving the model result, and defining the model error until the convergence criterion reaches a threshold.

14. The method of claim 13, wherein determining the reconstruction error is performed each time the model result is completed.

15. The method of claim 13, further comprising resolving an indication of hydrocarbon deposits from the geophysical basis after the convergence criterion reaches the threshold.

16. The method of claim 10, wherein the geophysical basis includes electrical resistivity.

17. A method of modeling a geophysical system, comprising:
- defining a geophysical model of an area of the earth;
- defining a domain for the geophysical model including a physical domain and a parameter domain, wherein the parameter domain comprises frequency, offset, and source position and receiver position;
- defining a sparse domain for the geophysical model, wherein the sparse domain has a sparse parameter domain that is a subset of the parameter domain, wherein a density of points in the sparse parameter domain varies with water depth as a function of the source position and the receiver position;
- determining a geophysical basis of the geophysical system;
- computing a sparse model result based on the sparse domain and the geophysical basis; and
- resolving a model result from the sparse model result by interpolation.

18. A method of determining physical properties of an area of the earth, comprising:
- obtaining a geophysical survey of an area of the earth;
- defining a geophysical model of the area of the earth;
- defining a domain of the geophysical model including a physical domain and a parameter domain, wherein the parameter domain comprises frequency, offset, and source position and receiver position;
- defining a sparse domain including the physical domain and a sparse parameter domain that is a subset of the parameter domain, wherein a density of points in the sparse parameter domain varies with water depth as a function of the source position and the receiver position;
- defining a geophysical basis for the area of the earth;
- computing a sparse model result based on the sparse domain using the geophysical model;
- resolving a model result from the sparse model result by interpolation;
- defining a model error by comparing the model result to the geophysical survey; and
- changing the geophysical basis based on the model error.

* * * * *